(12) United States Patent
Brundridge et al.

(10) Patent No.: US 8,001,303 B2
(45) Date of Patent: Aug. 16, 2011

(54) USB KEY EMULATION SYSTEM TO MULTIPLEX INFORMATION

(75) Inventors: Michael Brundridge, Georgetown, TX (US); Charles T. Perusse, Jr., Pflugerville, TX (US); Stephen D. Cochran, Cedar Park, TX (US); Anand Joshi, Round Rock, TX (US); Abhay Arjun Salunke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 11/949,893

(22) Filed: Dec. 4, 2007

(65) Prior Publication Data
US 2009/0144469 A1 Jun. 4, 2009

(51) Int. Cl.
G06F 3/00 (2006.01)
G06F 13/12 (2006.01)
G06F 13/38 (2006.01)
(52) U.S. Cl. .................. 710/74; 710/8; 710/62; 710/73
(58) Field of Classification Search .................. 710/13, 710/74, 315
See application file for complete search history.

(56) References Cited

U.S. PATENT DOCUMENTS

| | | | |
|---|---|---|---|
| 6,266,715 B1* | 7/2001 | Loyer et al. ................ | 710/22 |
| 6,636,929 B1* | 10/2003 | Frantz et al. ............... | 710/313 |
| 7,103,684 B2* | 9/2006 | Chen et al. ................. | 710/62 |
| 7,222,201 B2* | 5/2007 | Augustin et al. ............ | 710/105 |
| 7,222,211 B2* | 5/2007 | Lee et al. ................... | 710/315 |
| 7,395,366 B1* | 7/2008 | Wright ....................... | 710/315 |
| 7,640,382 B2* | 12/2009 | Blackwell et al. .......... | 710/74 |
| 2005/0120157 A1* | 6/2005 | Chen et al. ................. | 710/313 |
| 2005/0240712 A1* | 10/2005 | Klein ......................... | 710/313 |
| 2007/0047441 A1* | 3/2007 | Chouanard et al. ......... | 370/235 |
| 2007/0094426 A1* | 4/2007 | Chiang et al. .............. | 710/73 |
| 2007/0168481 A1* | 7/2007 | Lambert et al. ............ | 709/223 |
| 2007/0174526 A1* | 7/2007 | Blackwell et al. .......... | 710/73 |
| 2008/0168118 A1* | 7/2008 | Hickey et al. .............. | 709/201 |
| 2009/0138631 A1* | 5/2009 | Hung ......................... | 710/48 |

OTHER PUBLICATIONS

ThomasNet.com, "Press Release by ATEN Technology: Giving Servers a 'Check Up' . . . ATEN Introduces Industry's First KVM Switch with IPMI 2.0 Functionality", Copyright May 22, 2007 by ATEN, pp. 1-6.*
Business Wire, "Virtual media Now Available in Avocent DSView 3 Management Software; Market Leader Continues to Boaden the Role of KVM Switching in the Data Center", Copyright May 3, 2005 by Business Wire, pp. 1-2. http://findarticles.com/p/articles/mi_m0EIN/is_2005_May_3/ai_n13666893/.*
Bernard T. Han, George Diehr, An algorithm for storage device selection and file assignment, European Journal of Operational Research, vol. 61, Issue 3, Sep. 25, 1992, pp. 326-344, ISSN 0377-2217, DOI: 10.1016/0377-2217(92)90362-D. (http://www.sciencedirect.com/science/article/B6VCT-48NBM6Y-3D1/2/fa3c6ebc3312967121a8431543212870).*
"IEEE Standard Protocol for Authentication in Host Attachments of Transient Storage Devices," IEEE Std 1667-2006, vol., no., pp. 1-59, 2006 doi: 10.1109/IEEESTD.2006.371284 URL: http://ieeexplore.ieee.org/stamp/stamp.jsp?tp=&arnumber=4233255&isnumber=4233254.*

* cited by examiner

Primary Examiner — Tariq Hafiz
Assistant Examiner — Dayton Lewis-Taylor
(74) Attorney, Agent, or Firm — Haynes and Boone, LLP

(57) ABSTRACT

In an information handling system, a universal serial bus (USB) key emulation system includes a USB hub operable to communicate with a USB host, a USB bus communicatively coupled with the USB hub, a USB controller communicatively coupled with the USB bus via a set of endpoints, and a USB virtual media module communicatively coupled with the USB controller and operable to communicate data between the USB controller and a plurality of data storage devices as if the plurality of data storage devices are a single USB key.

18 Claims, 2 Drawing Sheets

USB KEY EMULATION SYSTEM TO MULTIPLEX INFORMATION

BACKGROUND

The present disclosure relates generally to information handling systems, and more particularly to universal serial bus (USB) key emulation system to multiplex information.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHS servers typically use memory storage devices such as, flash memory storage devices for storing and providing information, software, and/or other data components to the servers and other IHSs. Examples of components are drivers, HII data base, firmware, EFI shell, off line mail boxes, and a variety of other components. The components are used for different purposes and need to be made available to the software that runs on the server that uses the software. Typically, the components are accessed via a floppy drive, a CD ROM drive and/or one USB key. However, it would be desirable to have the ability to store and retrieve components from more data storage media devices such as, USB devices for ease of use and increased capability. However, adding more hardware and/or adding more USB controllers and/or multiple USB endpoints adds costs to the flash device systems.

USB key flash drive devices have increased in popularity recently due to their ease of use, large storage capability, low cost, and portability. However, use of a standard USB flash drive only allows for communication with information on the drive. However, in the ever growing world of high information use, it is desirable to be able to use more than one data storage device to connect to an IHS using a single USB connection.

Accordingly, it would be desirable to provide an improved a USB key emulation system absent the deficiencies described above.

SUMMARY

According to one embodiment, a universal serial bus (USB) key emulation system includes a USB hub operable to communicate with a USB host, a USB bus communicatively coupled with the USB hub, a USB controller communicatively coupled with the USB bus via a set of endpoints, and a USB virtual media module communicatively coupled with the USB controller and operable to communicate data between the USB controller and a plurality of data storage devices as if the plurality of data storage devices are a single USB key.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
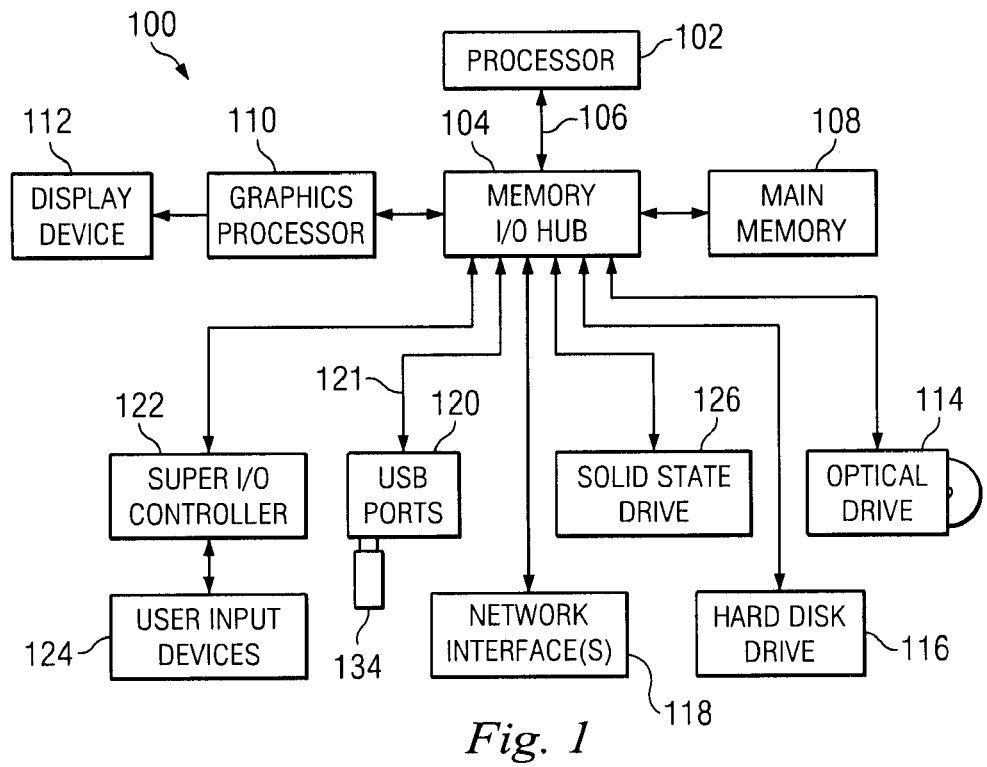
FIG. 1 is a block diagram of an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120 (communicatively coupled with the memory I/O hub 104 via a USB bus 121), and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together.

As can be appreciated, many systems are expandable, and include or can include a variety of components, including redundant or parallel resources.

Figure 2:
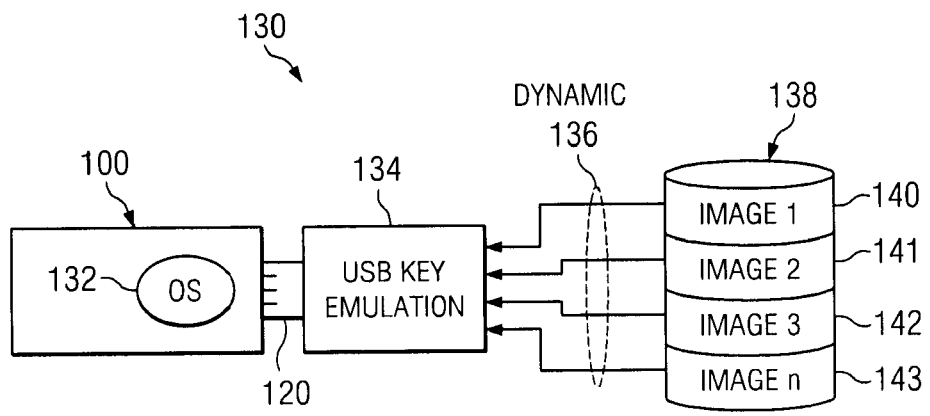
FIG. 2 is a block diagram of an embodiment of a USB key emulation system.

FIG. 2 illustrates an embodiment of a USB key emulation system 130. The system 130 has an IHS 100 using an operating system 132 to communicate with a USB key emulation system 134. In an embodiment, the USB key emulation system may couple with the IHS 100 via the USB port 120. The IHS 100 has an operating system 132 running on the IHS 100 to perform a variety of functions. Operating systems 132 are commonly understood by those having ordinary skill in the art and it is to be understood that any type of operating system 132 such as, Windows™, Linux™, BIOS, and others, may be used with the IHS 100.

In an embodiment, the USB key emulation system 134 appears to the operating system 132 to be a single USB flash drive, while coupling with one or more storage devices 138 via a dynamic communication network 136 such as, a local area network (LAN), a wide area network (WAN), and/or the Internet. As such, the IHS 100 and the operating system 132 use hardware for connecting to a single flash drive device, but have access to multiple images 140, 141, 142, and/or 143 on one or more storage devices 138. The images 140, 141, 142, 143 may be software, data, operating system drivers, BIOS information, firmware, and the like.

In an embodiment, a single USB key emulation system or device may couple with an IHS 100 using the USB port 120 and allow the IHS 100 to access multiple storage devices 138 (e.g., flash memory storage devices). It is to be understood that in an embodiment, emulation means to imitate the function of another system (e.g., a single USB key input imitating the function of multiple USB key inputs), as by modifications to hardware and/or software. In an embodiment, an intelligent platform management interface (IPMI) communication system may be used to communicate with and allow remote management of the systems.

Figure 3:
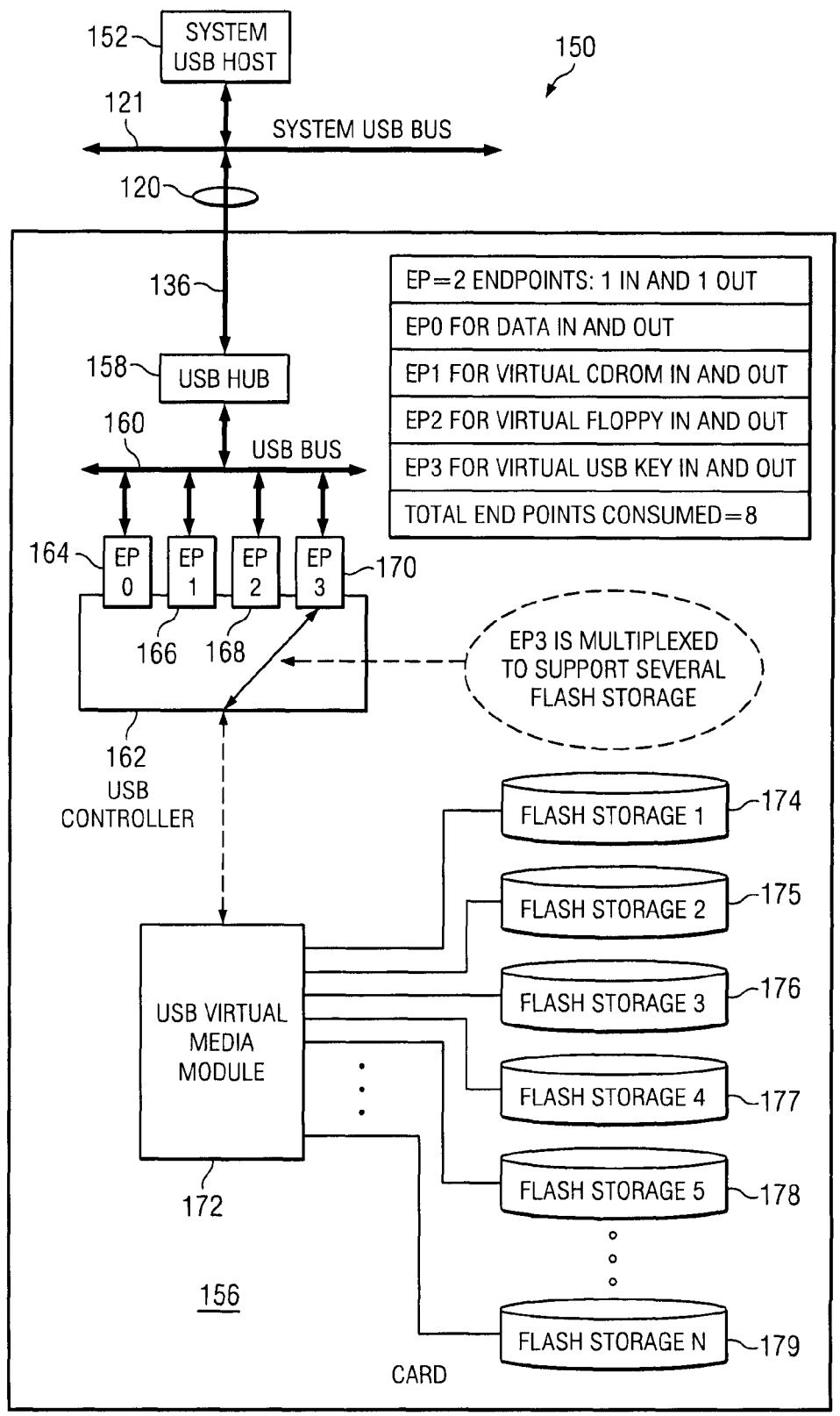
FIG. 3 is a block diagram of an embodiment of a USB system.

FIG. 3 illustrates a block diagram of an embodiment of a USB system 150. A system USB host 152 may be an information handling system similar to the IHS 100. The USB host 152 has a system USB bus 121 for communication between the USB port 120 and the other components of the USB host 152. In an embodiment, a remote access controller 156 (e.g., a remote server) communicates via the communication network 136 with the system USB host 152.

A USB hub 158 couples a USB bus 160 with the communication network 136. A standard USB connector may be used for this coupling, however, other types of coupling may be used. A USB controller 162 controls the communications of the operations and communications for the USB system in and out of the remote access controller 156. One or more endpoint sets 164, 166, 168, and 170 couple the USB controller with the USB bus 160. It is commonly understood that endpoint sets 164, 166, 168, and 170 generally have two connection points, making a set of endpoints. The endpoints 164, 166, 168, and 170 are discussed as a single endpoint set for simplicity. The set of endpoints may use the two connection points where one is for communication into the USB controller 162, and one is for communication out of the USB controller 162. In an embodiment, the endpoint set 164 is for transferring Data in and out of the remote access controller 156. In an embodiment, the endpoint set 166 is for transferring information to and from the remote access controller 156 as a virtual CD ROM drive in and out. In an embodiment, the endpoint set 168 is for transferring information to and from the remote access controller 156 as a virtual floppy drive in and out. In an embodiment, the endpoint set 170 is for transferring information to and from the remote access controller 156 as a virtual USB key in and out. As such, the system USB host 152 (e.g., an IHS 100) may use the processing, data storage, and etc., as if it is local to the USB host 152 IHS. Adding more endpoints (e.g., 164, 166, 168, and 170) to the USB controller 162 of the remote access controller 156 is costly and therefore undesirable.

A virtual media module 172 couples between the USB controller 162 and any number of storage devices 174, 175, 176, 177, 178, and/or 179. In an embodiment, the storage devices 174, 175, 176, 177, 178, and/or 179 may be flash storage devices, but any type of storage devices may be used. Communication signals between the USB virtual media module 172 and the endpoint set 170 may be multiplexed to allow transfer of information from multiple storage devices (e.g., storage devices 174, 175, 176, 177, 178, and/or 179), while the USB bus 160 only sees one set of endpoints 170. In other words, the system 150 emulates a single set of USB endpoints, while allowing access to multiple storage devices and/or multiple images on the storage devices (e.g., 140, 141, 142, 143).

In an embodiment, a standard virtual media implementation may be composed of a virtual floppy, virtual CD ROM, and/or a virtual USB key (e.g., 134). These virtual devices are supported by a USB controller 162 which exposes a composite USB device 172 to the USB hub 158. The USB controller 162 exposes each USB device to the USB bus 160 via endpoint sets 164, 166, 168, and/or 170. Each individual device (e.g., virtual CD ROM drive, virtual floppy drive, and/or virtual USB key) will typically consume two endpoints, one for incoming data and one for outgoing data with an additional endpoint set for control in and out data flow. Thus, in an embodiment, a system may have eight endpoints total.

The virtual media USB code running the remote access controller 156 may make individual flash components (e.g., storage devices 174, 175, 176, 177, 178, and/or 179) available to be seen by the server as a virtual key. The application running on the server will send an IPMI request to the remote access controller 156 for choosing a particular flash component (e.g., storage devices 174, 175, 176, 177, 178, and/or 179) and based on the request the remote access controller 156 may switch the flash component (e.g., storage devices 174, 175, 176, 177, 178, and/or 179) and reset the USB bus 160. This may make the server software re-enumerate the USB devices and may see the new composite device exposed by the remote server in which the virtual key is now pointing to the new flash component.

This solution solves this problem by making multiple USB keys available to the server without having a need to increase the number of endpoints and is usable with standard off-the-shelf hardware to support the flash storage devices (e.g., storage devices 174, 175, 176, 177, 178, and/or 179). The flash storage devices (e.g., storage devices 174, 175, 176, 177, 178, and/or 179) may be made available to the server using the virtual key.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A universal serial bus (USB) key emulation system, comprising:
   a USB host including a storage device selection application; and a remote access controller coupled to the USB host through a communications network, the remote access controller including:
: a USB hub coupled to the communications network;
: a USB bus coupled to the USB host over the communications network through the USB hub;
: a USB controller coupled to the USB bus via only four endpoint sets, wherein one of the endpoint sets comprises a virtual USB key endpoint set; and
: a USB virtual media module coupled to the virtual USB key endpoint set and a plurality of data storage devices;
wherein the storage device selection application is operable to send a request that includes a selection of a particular data storage device from the plurality of storage devices and, in response to receiving the request, the remote access controller switches to the particular data storage device that was selected and resets the USB bus, and
wherein the reset of the USB bus causes the USB host to re-enumerate the plurality of data storage devices such that the virtual USB key endpoint set allows access by the USB host to the particular data storage device that was selected.

2. The USB key emulation system of claim 1, wherein the endpoint sets also include a control endpoint set, a virtual compact disk read-only memory (CDROM) drive endpoint set, and a virtual floppy drive endpoint set.

3. The USB key emulation system of claim 1, wherein each of the endpoint sets includes an incoming data endpoint and an outgoing data endpoint.

4. The USB key emulation system of claim 1, wherein at least one of the plurality of data storage devices is a flash storage device.

5. The USB key emulation system of claim 1, wherein the request that the storage device selection application is operable to send comprises an intelligent platform management interface (IPMI) request.

6. The USB key emulation system of claim 1, wherein the re-enumerating of the plurality of data storage devices results in the virtual USB key endpoint set allowing access by the USB host to only the particular data storage device that was selected.

7. An information handling system (IHS) comprising:
: an IHS processor;
: a storage device selection application located on a non-transitory computer-readable medium that is coupled to the IHS processor;
: an IHS USB (universal serial bus) bus that is coupled to the processor; and
: a remote access controller coupled to the IHS USB bus, the remote access controller including:
: : a USB hub;
: : a USB bus coupled to the USB hub;
: : a USB controller coupled to the USB bus via only four endpoint sets, wherein one of the endpoint sets comprises a virtual USB key endpoint set; and
: : a USB virtual media module coupled to the virtual USB key endpoint set and a plurality of data storage devices;
wherein the storage device selection application is operable to send a request that includes a selection of a particular data storage device from the plurality of data storage devices, and, in response to receiving the request, the remote access controller switches to the particular data storage device that was selected and resets the USB bus, and
wherein the reset of the USB bus causes the USB host to re-enumerate the plurality of data storage devices such that the virtual USB key endpoint set allows access by the USB host to the particular data storage device that was selected.

8. The IHS of claim 7, wherein the endpoint sets also include a control endpoint set, a virtual compact disk read-only memory (CDROM) drive endpoint set, and a virtual floppy drive endpoint set.

9. The IHS of claim 7, wherein each of the endpoint sets includes an incoming data endpoint and an outgoing data endpoint.

10. The IHS of claim 7, wherein at least one of the plurality of data storage devices is a flash storage device.

11. The IHS of claim 7, wherein the request that the storage device selection application is operable to send comprises an intelligent platform management interface (IPMI) request.

12. The IHS of claim 7, wherein the re-enumerating of the plurality of data storage devices results in the virtual USB key endpoint set allowing access by the USB host to only the particular data storage device that was selected.

13. A method of emulating a universal serial bus (USB) key comprising:
: providing a USB host coupled to a remote access controller that includes a USB bus, wherein a USB controller on the remote access controller is coupled to the USB bus via only four endpoint sets, and wherein one of the endpoint sets comprises a virtual USB key endpoint set that is coupled to a plurality of data storage devices using a USB virtual media module;
: sending a request from the USB host to the remote access controller, wherein the request includes a selection of a particular data storage device from the plurality of data storage devices;
: switching, by the remote access controller in response to receiving the request, to the particular storage device that was selected;
: resetting, by the remote access controller in response to receiving the request, the USB bus; and
: re-enumerating, by the USB host in response to the resetting of the USB bus, the plurality of data storage devices such that the virtual USB key endpoint allows access by the USB host to the particular data storage device that was selected.

14. The method of claim 13, wherein the endpoint sets also include a control endpoint set, a virtual compact disk read-only memory (CDROM) drive endpoint set, and a virtual floppy drive endpoint set.

15. The method of claim 13, wherein the each of the endpoint sets includes an incoming data endpoint and an outgoing data endpoint.

16. The method of claim 13, wherein at least one of the plurality of data storage devices stores information on a flash storage device.

17. The method of claim 13, wherein the request comprises an intelligent platform management interface (IPMI) request.

18. The method of claim 13,
: wherein the re-enumerating of the plurality of data storage devices results in the virtual USB key endpoint set allowing access by the USB host to only the particular data storage device that was selected.

* * * * *